(12) United States Patent
Sundararajan et al.

(10) Patent No.: US 11,025,309 B2
(45) Date of Patent: Jun. 1, 2021

(54) UPLINK MULTIPLE-INPUT MULTIPLE-OUTPUT (MIMO) SCHEDULING USING BEAMFORMED REFERENCE SIGNALS

(71) Applicant: QUALCOMM Incorporated, San Diego, CA (US)

(72) Inventors: Jay Kumar Sundararajan, San Diego, CA (US); Naga Bhushan, San Diego, CA (US); Haitong Sun, Sunnyvale, CA (US); Tingfang Ji, San Diego, CA (US); Yu Zhang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/324,653

(22) PCT Filed: Aug. 11, 2017

(86) PCT No.: PCT/CN2017/097197
§ 371 (c)(1),
(2) Date: Feb. 11, 2019

(87) PCT Pub. No.: WO2018/028693
PCT Pub. Date: Feb. 15, 2018

(65) Prior Publication Data
US 2019/0199413 A1    Jun. 27, 2019

(30) Foreign Application Priority Data

Aug. 12, 2016 (WO) ................ PCT/CN2016/094956

(51) Int. Cl.
*H04B 7/02* (2018.01)
*H04B 7/0417* (2017.01)
(Continued)

(52) U.S. Cl.
CPC ......... *H04B 7/0417* (2013.01); *H04B 7/0404* (2013.01); *H04B 7/0452* (2013.01);
(Continued)

(58) Field of Classification Search
CPC .. H04B 7/0417; H04B 7/0404; H04B 7/0452; H04B 7/0617; H04B 7/063; H04B 7/0634; H04B 7/0695; H04W 72/14
(Continued)

(56) References Cited

U.S. PATENT DOCUMENTS 8,868,091 B2    10/2014  Damnjanovic et al.
2009/0239565 A1  9/2009  Han et al.
(Continued)

FOREIGN PATENT DOCUMENTS

CN    101610104 A    12/2009
CN    101741446 A     6/2010
(Continued)

OTHER PUBLICATIONS

International Search Report and Written Opinion—PCT/CN2016/094956—ISA/EPO—dated May 12, 2017.
(Continued)

*Primary Examiner* — Zewdu A Kassa
(74) *Attorney, Agent, or Firm* — Patterson & Sheridan, L.L.P

(57) ABSTRACT

Aspects of the present disclosure provide methods and apparatus for selecting beamforming parameters for uplink transmissions based on an uplink reference signal. An example method generally includes identifying one or more parameters for beamformed transmission to a transmit receive point (TRP), transmitting a reference signal using beamforming in accordance with the identified parameters, and receiving, from the TRP in response to the reference
(Continued)

signal, signaling for adjusting the one or more parameters for one or more subsequent beamformed transmissions.

30 Claims, 15 Drawing Sheets

(51) Int. Cl.
    *H04B 7/06*         (2006.01)
    *H04B 7/0404*     (2017.01)
    *H04B 7/0452*     (2017.01)
    *H04W 72/14*     (2009.01)

(52) U.S. Cl.
    CPC .......... *H04B 7/063* (2013.01); *H04B 7/0617* (2013.01); *H04B 7/0634* (2013.01); *H04B 7/0695* (2013.01); *H04W 72/14* (2013.01)

(58) Field of Classification Search
    USPC ............... 375/267, 260, 259, 295, 316, 219
    See application file for complete search history.

(56) References Cited

U.S. PATENT DOCUMENTS

| | | |
|---|---|---|
| 2012/0120884 A1 | 5/2012 | Yu et al. |
| 2013/0229307 A1 | 9/2013 | Chang et al. |
| 2013/0258972 A1 | 10/2013 | Kim et al. |
| 2014/0342729 A1* | 11/2014 | Damnjanovic ...... H04B 7/0617 455/422.1 |
| 2016/0099763 A1* | 4/2016 | Chen ................ H04W 56/0045 370/329 |
| 2017/0141823 A1* | 5/2017 | Fodor .................. H04B 7/0456 |
| 2017/0279502 A1* | 9/2017 | Kim ...................... H04L 5/0051 |
| 2018/0034529 A1* | 2/2018 | Hessler ................ H04B 7/0404 |
| 2019/0288809 A1* | 9/2019 | Iyer ....................... H04L 1/0026 |
| 2019/0313314 A1* | 10/2019 | Yang ..................... H04W 24/08 |

FOREIGN PATENT DOCUMENTS

| | | |
|---|---|---|
| CN | 101938302 A | 1/2011 |
| CN | 103891161 A | 6/2014 |
| CN | 104303428 A | 1/2015 |
| CN | 105007126 A | 10/2015 |
| CN | 105580448 A | 5/2016 |
| WO | 2011088465 | 7/2011 |

OTHER PUBLICATIONS

International Search Report and Written Opinion—PCT/CN2017/097197—ISA/EPO—dated Nov. 2, 2017.
Supplementary European Search Report—EP17838823—Search Authority—Munich—dated May 28, 2019.

* cited by examiner

UPLINK MULTIPLE-INPUT MULTIPLE-OUTPUT (MIMO) SCHEDULING USING BEAMFORMED REFERENCE SIGNALS

CROSS-REFERENCE TO RELATED APPLICATIONS

This application is a national stage application under 35 U.S.C. 371 of PCT/CN2017/097197, filed Aug. 11, 2017, which claims the benefit of PCT Application Serial No. PCT/CN2016/094956, filed Aug. 12, 2016 and entitled "Uplink Multiple-Input Multiple-Output (MIMO) Scheduling Using Beamformed Reference Signals," both of which are incorporated herein by reference in their entireties.

TECHNICAL FIELD

The present disclosure generally relates to wireless communications and, more particularly, to scheduling transmissions for a wireless node based on a beamformed reference signal.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Some wireless communication standards base user equipment handoff decisions based, at least in part, on downlink measurements. Future generation wireless communication may focus on user-centric networks. Accordingly, it may be desirable to have an efficient handover framework for user-centric networks.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communication by a wireless node. The method generally includes identifying one or more parameters for beamformed transmission to a transmit receive point (TRP), transmitting a reference signal using beamforming in accordance with the identified parameters, and receiving, from the TRP in response to the reference signal, signaling for adjusting the one or more parameters for one or more subsequent beamformed transmissions.

Certain aspects of the present disclosure provide an apparatus for wireless communication. The apparatus generally includes a processor configured to identify one or more parameters for beamformed transmission to a transmit receive point (TRP), transmit a reference signal using beamforming in accordance with the identified parameters, and receive, from the TRP in response to the reference signal, signaling for adjusting the one or more parameters for one or more subsequent beamformed transmissions, and a memory coupled to the processor.

Certain aspects of the present disclosure provide a method for wireless communications by a transmit receive point (TRP). The method generally includes receiving, from a wireless node, a beamformed reference signal, determining, based on the beamformed reference signal, one or more parameters for the wireless node to use for adjusting subsequent beamformed transmissions, and signaling the parameters to the wireless node.

Certain aspects of the present disclosure provide an apparatus for wireless communications. The apparatus generally includes a processor configured to receive, from a wireless node, a beamformed reference signal, determine, based on the beamformed reference signal, one or more parameters for the wireless node to use for adjusting subsequent beamformed transmissions, and signal the parameters to the wireless node, and a memory coupled to the processor.

Aspects generally include methods, apparatus, systems, computer program products, and processing systems, as substantially described herein with reference to and as illustrated by the accompanying drawings.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
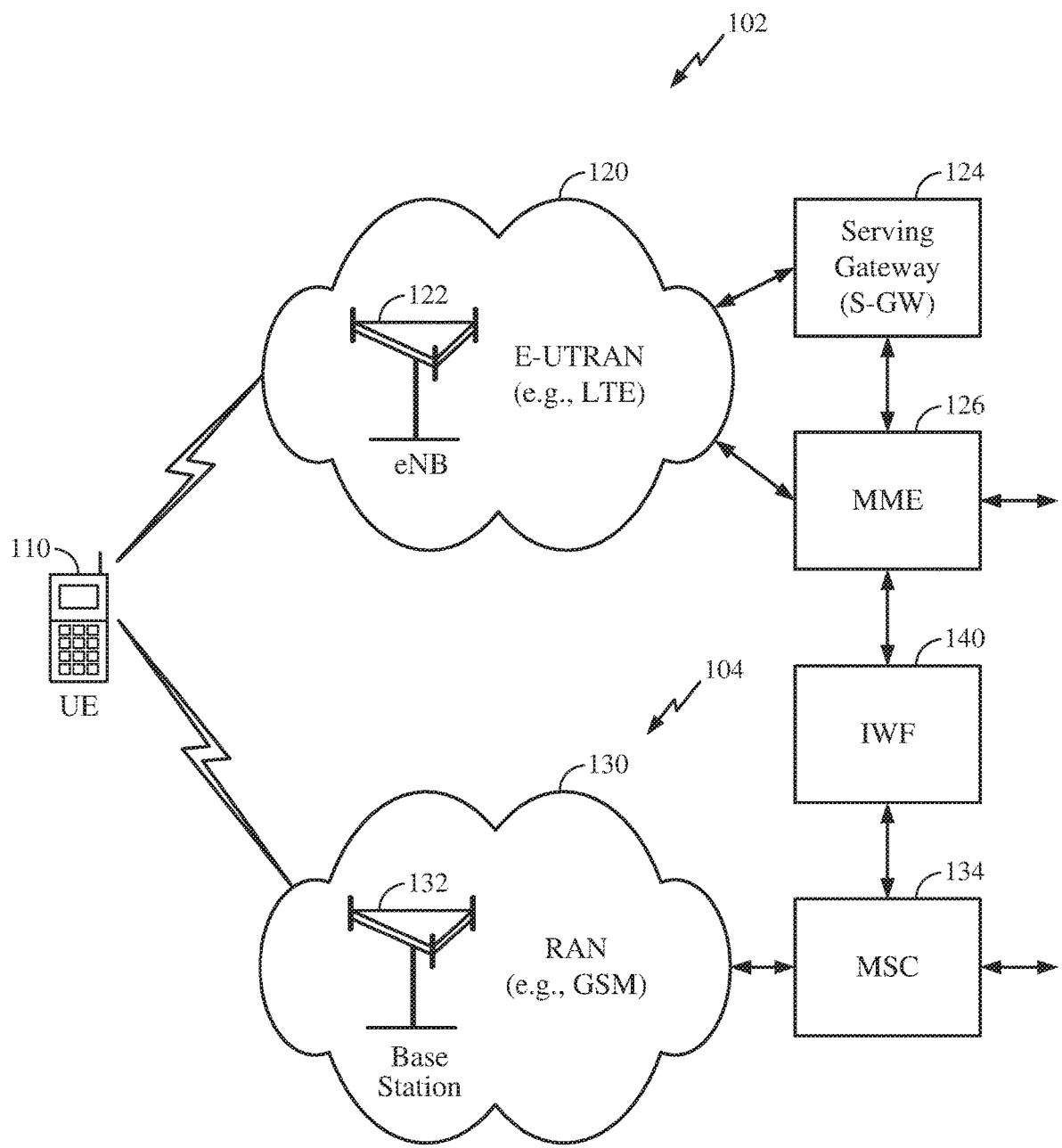
FIG. 1 illustrates an exemplary deployment in which multiple wireless networks have overlapping coverage, in accordance with certain aspects of the disclosure.

Aspects of the present disclosure provide for selection of beamforming settings for uplink transmissions based on a beamformed uplink reference signal. By receiving a beamformed reference signal from a wireless node, a TRP can use the beamformed reference signal and other information available at the TRP (e.g., mutual interference information) to identify transmission parameters for different wireless nodes to use in subsequent transmissions to the TRP.

Advantageously, downselection of users and beams may reduce the amount of data to provide in a uplink grant by the TRP. Downselection may also help avoid interference among the selected beams and/or users. In some cases, if the wireless node and the beams are selected without changes for data transmission, TRPs may obtain an accurate estimate of the interference covariance matrix, as the set of interferers may remain constant.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software/firmware, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software/firmware, or combinations thereof. If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

The techniques described herein may be used for various wireless communication networks such as code division multiple access (CDMA), time division multiple access (TDMA), frequency division multiple access (FDMA), orthogonal FDMA (OFDMA), single carrier FDMA (SC-FDMA) and other networks. The terms "network" and "system" are often used interchangeably. A CDMA network may implement a radio access technology (RAT) such as universal terrestrial radio access (UTRA), cdma2000, etc. UTRA includes wideband CDMA (WCDMA) and other variants of CDMA. cdma2000 covers IS-2000, IS-95 and IS-856 standards. IS-2000 is also referred to as 1× radio transmission technology (1×RTT), CDMA2000 1×, etc. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP long-term evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and RATs mentioned above as well as other wireless networks and RATs.

It is noted that while aspects may be described herein using terminology commonly associated with 3G and/or 4G wireless technologies, aspects of the present disclosure can be applied in other generation-based communication systems, such as 5G and later.

An Example Wireless Communication System

FIG. 1 illustrates an example deployment in which aspects of the present disclosure may be implemented. For example, a user equipment (UE) 110 transmits an uplink reference signal to a base station (BS) such as eNB 122 (e.g., a transmission reception point (TRP)). The uplink reference signal can include an indication of a preferred downlink beam. The UE 110 can receive a downlink from the eNB 122 based, at least in part, on the uplink reference signal. For downlink-based mobility, the UE may receive measurement reference signals (MRS) transmitted with different beams from the eNB 122. The UE 110 can select the preferred beam based on the MRS. The eNB 122 can beamform the downlink signal to the UE using the preferred beam and/or the eNB 122 can send a handover command to the UE 110 based, at least in part, on the uplink reference signal. For uplink-based mobility the UE 110 sends the uplink reference signal, without MRS from the eNB 122, and the eNB 122 can perform beam selection and/or handover decisions based on measurement of the uplink reference signal. In some cases a non-serving eNB can receive the uplink reference signals and send a handover command to the UE 110.

FIG. 1 shows an exemplary deployment in which multiple wireless networks have overlapping coverage. A radio access network such as an evolved universal terrestrial radio access network (E-UTRAN) 120 may support LTE and may include a number of evolved Node Bs (eNBs) 122 (e.g., TRPs) and other network entities that can support wireless communication for user equipments (UEs). Each eNB may provide communication coverage for a particular geographic area. The term "cell" can refer to a coverage area of an eNB and/or an eNB subsystem serving this coverage area. A serving gateway (S-GW) 124 may communicate with E-UTRAN 120 and may perform various functions such as packet routing and forwarding, mobility anchoring, packet buffering, initiation of network-triggered services, etc. A mobility management entity (MME) 126 may communicate with E-UTRAN 120 and serving gateway 124 and may perform various functions such as mobility management, bearer management, distribution of paging messages, security control, authentication, gateway selection, etc. The network entities in LTE are described in 3GPP TS 36.300, entitled "Evolved Universal Terrestrial Radio Access (E-UTRA) and Evolved Universal Terrestrial Radio Access Network (E-UTRAN); Overall description." which is publicly available.

A radio access network (RAN) 130 may support GSM and may include a number of base stations 132 and other network entities that can support wireless communication for UEs. A mobile switching center (MSC) 134 may communicate with the RAN 130 and may support voice services, provide routing for circuit-switched calls, and perform mobility management for UEs located within the area served by MSC 134. Optionally, an inter-working function (IWF) 140 may facilitate communication between MME 126 and MSC 134 (e.g., for 1×CSFB).

E-UTRAN 120, serving gateway 124, and MME 126 may be part of an LTE network 102. RAN 130 and MSC 134 may be part of a GSM network 104. For simplicity, FIG. 1 shows only some network entities in the LTE network 102 and the GSM network 104. The LTE and GSM networks may also include other network entities that may support various functions and services.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs.

A UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, etc. In aspects, UE 110 may be a Dual SIM dual standby (DSDS) UE.

Upon power up, UE 110 may search for wireless networks from which it can receive communication services. If more than one wireless network is detected, then a wireless network with the highest priority may be selected to serve UE 110 and may be referred to as the serving network. UE 110 may perform registration with the serving network, if necessary. UE 110 may then operate in a connected mode to actively communicate with the serving network. Alternatively, UE 110 may operate in an idle mode and camp on the serving network if active communication is not required by UE 110.

UE 110 may be located within the coverage of cells of multiple frequencies and/or multiple RATs while in the idle mode. For LTE, UE 110 may select a frequency and a RAT to camp on based on a priority list. This priority list may include a set of frequencies, a RAT associated with each frequency, and a priority of each frequency. For example, the priority list may include three frequencies X, Y and Z. Frequency X may be used for LTE and may have the highest priority, frequency Y may be used for GSM and may have the lowest priority, and frequency Z may also be used for GSM and may have medium priority. In general, the priority list may include any number of frequencies for any set of RATs and may be specific for the UE location. UE 110 may be configured to prefer LTE, when available, by defining the priority list with LTE frequencies at the highest priority and with frequencies for other RATs at lower priorities, e.g., as given by the example above.

UE 110 may operate in the idle mode as follows. UE 110 may identify all frequencies/RATs on which it is able to find a "suitable" cell in a normal scenario or an "acceptable" cell in an emergency scenario, where "suitable" and "acceptable" are specified in the LTE standards. UE 110 may then camp on the frequency/RAT with the highest priority among all identified frequencies/RATs. UE 110 may remain camped on this frequency/RAT until either (i) the frequency/RAT is no longer available at a predetermined threshold or (ii) another frequency/RAT with a higher priority reaches this threshold. This operating behavior for UE 110 in the idle mode is described in 3GPP TS 36.304, entitled "Evolved Universal Terrestrial Radio Access (E-UTRA); User Equipment (UE) procedures in idle mode," which is publicly available.

UE 110 may be able to receive packet-switched (PS) data services from LTE network 102 and may camp on the LTE network while in the idle mode. LTE network 102 may have limited or no support for voice-over-Internet protocol (VoIP), which may often be the case for early deployments of LTE networks. Due to the limited VoIP support, UE 110 may be transferred to another wireless network of another RAT for voice calls. This transfer may be referred to as circuit-switched (CS) fallback. UE 110 may be transferred to a RAT that can support voice service such as 1×RTT, WCDMA, GSM, etc. For call origination with CS fallback, UE 110 may initially become connected to a wireless network of a source RAT (e.g., LTE) that may not support voice service. The UE may originate a voice call with this wireless network and may be transferred through higher-layer signaling to another wireless network of a target RAT that can support the voice call. The higher-layer signaling to transfer the UE to the target RAT may be for various procedures, e.g., connection release with redirection, PS handover, etc.

Figure 2:
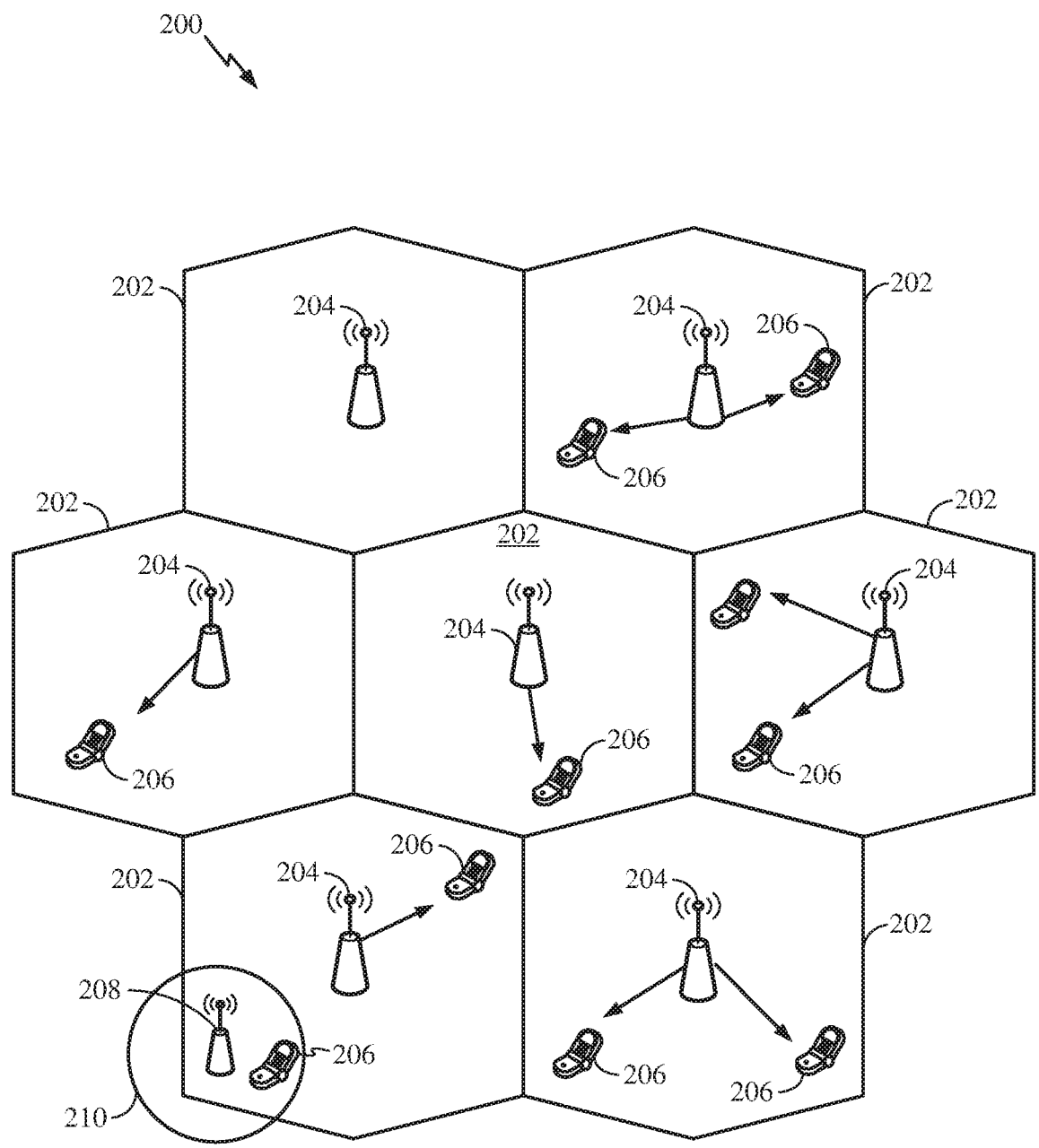
FIG. 2 is a diagram illustrating an example of an access network, in accordance with certain aspects of the disclosure.

FIG. 2 is a diagram illustrating an example of an access network 200 in an LTE network architecture. UE 206 may transmit an uplink reference signal which may be received by both a serving and non-serving eNB. Serving and non-serving eNBs 204, 208 may receive the uplink reference signal and either of the eNBs may transmit a handover command to the UE based, at least in part, on the uplink reference signal.

In FIG. 2, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 124.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
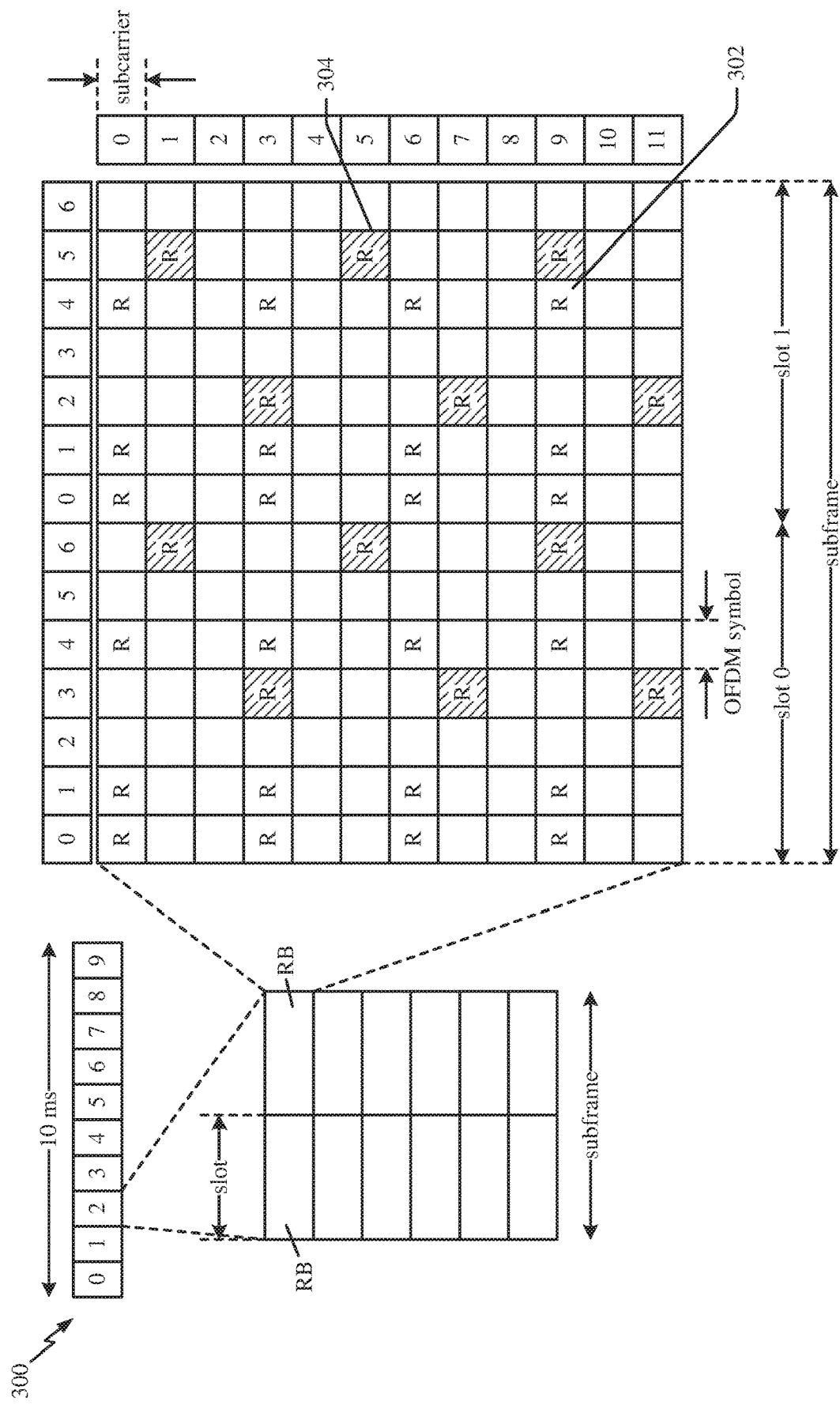
FIG. 3 is a diagram illustrating an example of a DL frame structure in LTE, in accordance with certain aspects of the disclosure.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
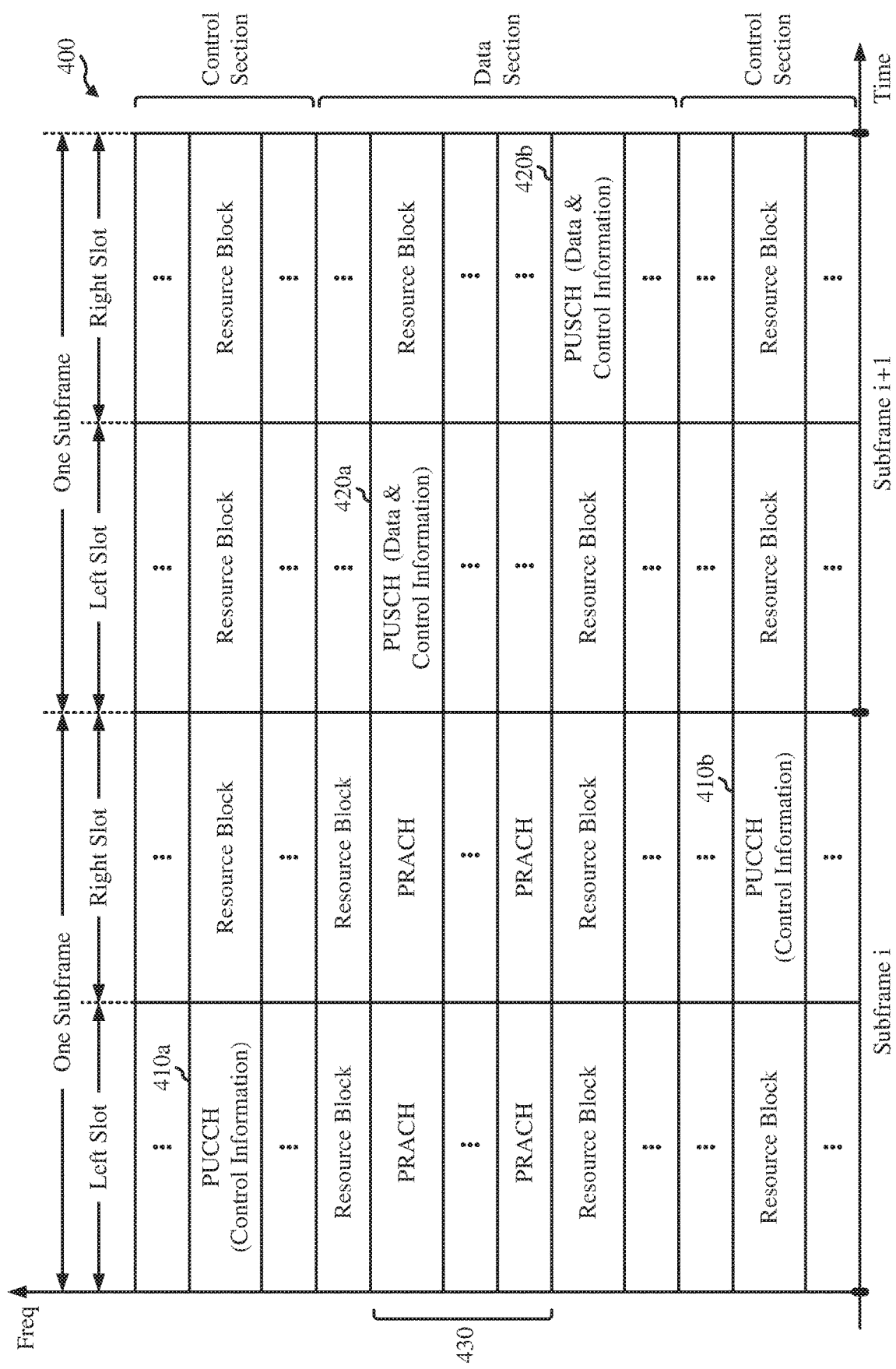
FIG. 4 is a diagram illustrating an example of an UL frame structure in LTE, in accordance with certain aspects of the disclosure.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (I ms) or in a sequence of few contiguous subframes and a UE can make only a single PRACH attempt per frame (10 ms).

Figure 5:
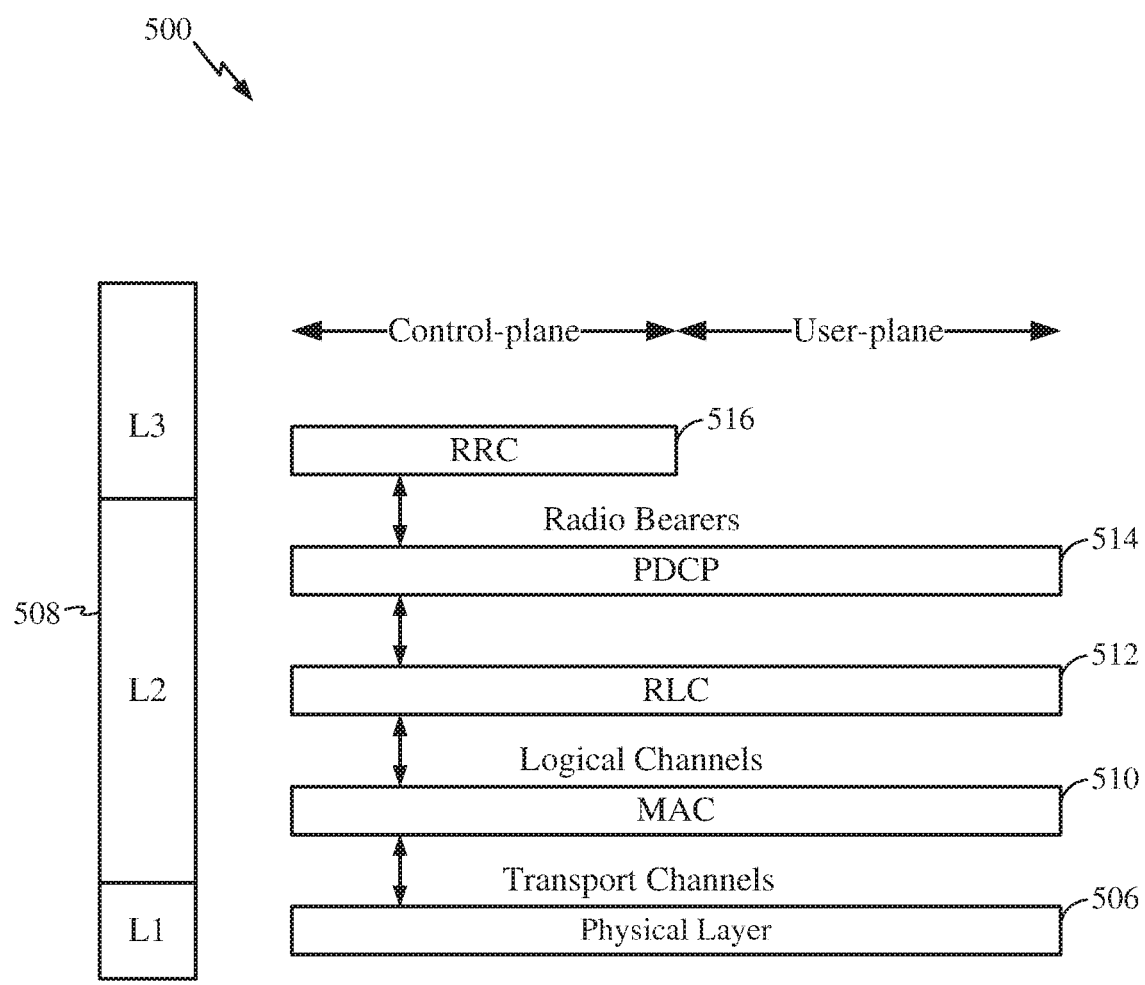
FIG. 5 is a diagram illustrating an example of a radio protocol architecture for the user and control plane, in accordance with certain aspects of the disclosure.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
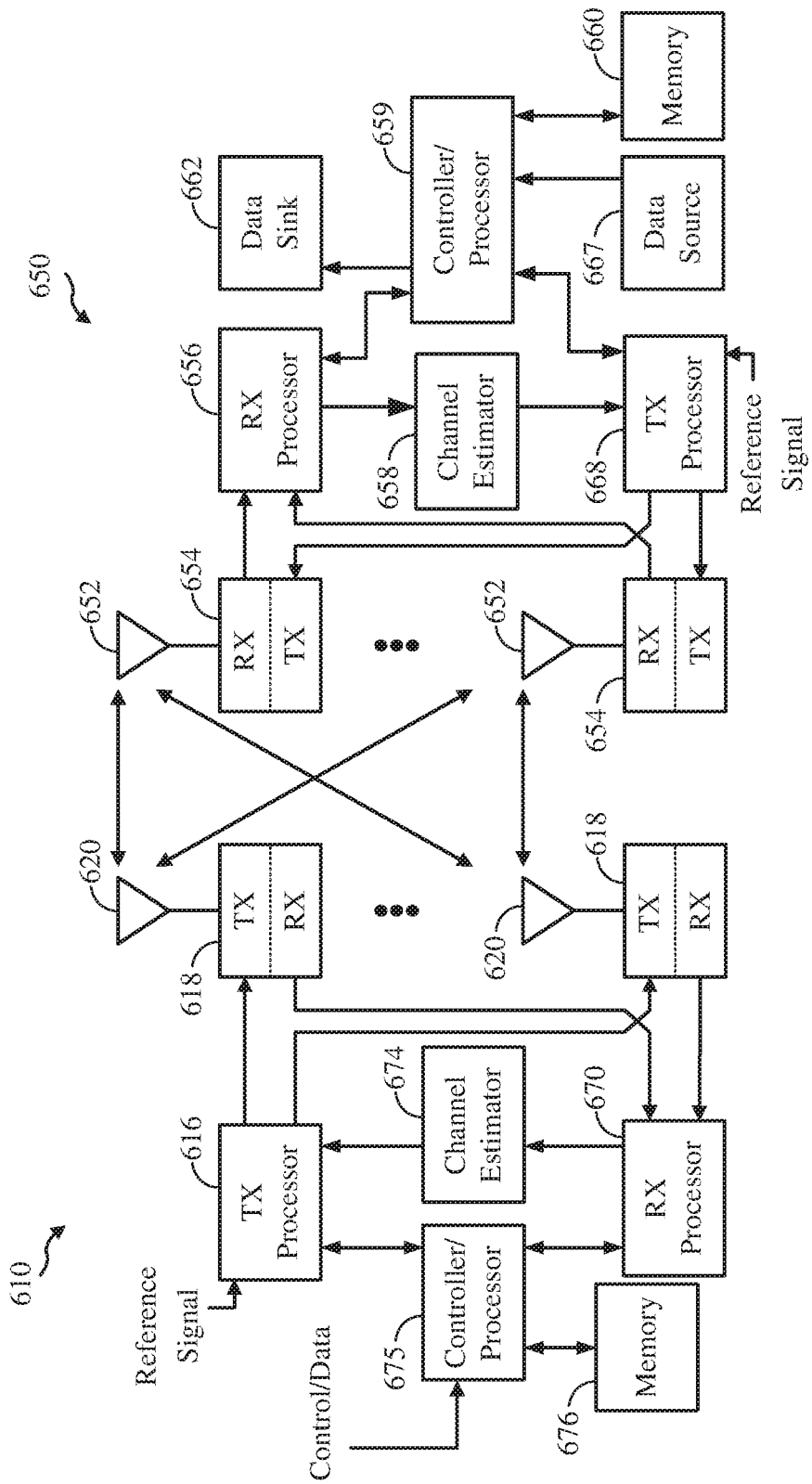
FIG. 6 is a diagram illustrating an example of an evolved Node B (eNB) and user equipment (UE) in an access network, in accordance with certain aspects of the disclosure.

FIG. 6 is a block diagram of an eNB 610 in communication with a UE 650 in an access network in accordance with aspects of the present disclosure. The eNBs of FIG. 1 and FIG. 2 may include one or more components of eNB 610 illustrated in FIG. 6. Similarly, the UEs illustrated in FIGS. 1 and 2 may include one or more components of UE 650 as illustrated in FIG. 6. One or more components of the UE 650 and eNB 610 may be configured to perform the operations described herein.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor 659 can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

The controller/processor 659 may direct the operation at the UE 650. The controller/processor 659 and/or other processors, components, and/or modules at the UE 650 may perform or direct operations performed by the UE as described herein. The controller/processor 675 may direct the operations at the eNB 610. The controller/processor 675 and/or other processors, components, and/or modules at the eNB 610 may perform or direct operations performed by the eNB as described herein. In aspects, one or more of any of the components shown in FIG. 6 may be employed to perform example operations 900, 1000, 1300, and 1400 shown in FIGS. 9, 10, 13, and 14, respectively, and can also perform other UE and eNB operations for the techniques described herein.

For example, one or more of the antenna 620, transceiver 618, controller/processor, and memory 676 may be configured to receive an uplink reference signal from a UE, measure the uplink reference signal, and transmit a handover command, as described herein. One or more of the antenna 652, transceiver 654, controller/processor 659, and memory 660 may be configured to transmit an uplink reference signal and receive a beamformed downlink signal or handover command, as described herein.

Example New Radio (NR)/5G Radio Access Network (RAN) Architecture

While aspects of the examples described herein may be associated with LTE technologies, aspects of the present disclosure may be applicable with other wireless communications systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 75 kHz over a 0.1 ms duration or a bandwidth of 15 kHz over a 1 ms duration. Each radio frame may consist of 10 or 50 subframes with a length of 10 ms. Each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 9 and 10.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS)—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 7:
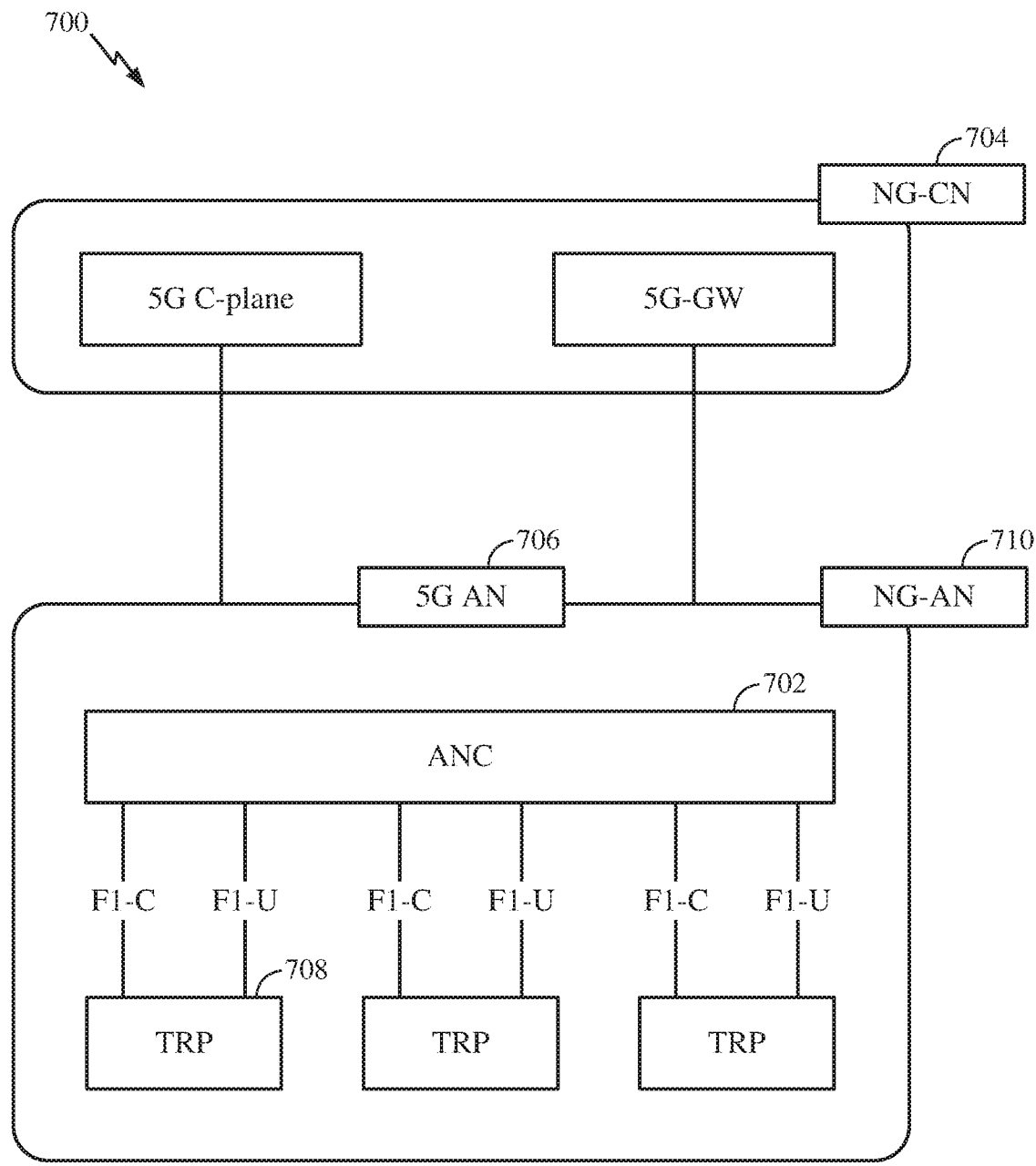
FIG. 7 illustrates an example logical architecture of a distributed radio access network (RAN), in accordance with certain aspects of the present disclosure.

FIG. 7 illustrates an example logical architecture of a distributed RAN 700, according to aspects of the present disclosure. A 5G access node 706 may include an access node controller (ANC) 702. The ANC may be a central unit (CU) of the distributed RAN 700. The backhaul interface to the next generation core network (NG-CN) 704 may terminate at the ANC. The backhaul interface to neighboring next generation access nodes (NG-ANs) may terminate at the ANC. The ANC may include one or more TRPs 708 (which may also be referred to as BSs, NR BSs, Node Bs, 5G NBs, APs, or some other term). As described above, a TRP may be used interchangeably with "cell."

The TRPs 708 may be a distributed unit (DU). The TRPs may be connected to one ANC (ANC 702) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 700 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 710 may support dual connectivity with NR. The NG-AN may share a common fronthaul for LTE and NR.

The architecture may enable cooperation between and among TRPs 708. For example, cooperation may be preset within a TRP and/or across TRPs via the ANC 702. According to aspects, no inter-TRP interface may be needed/present.

According to aspects, a dynamic configuration of split logical functions may be present within the architecture 700. The PDCP, RLC, MAC protocol may be adaptably placed at the ANC or TRP.

Figure 8:
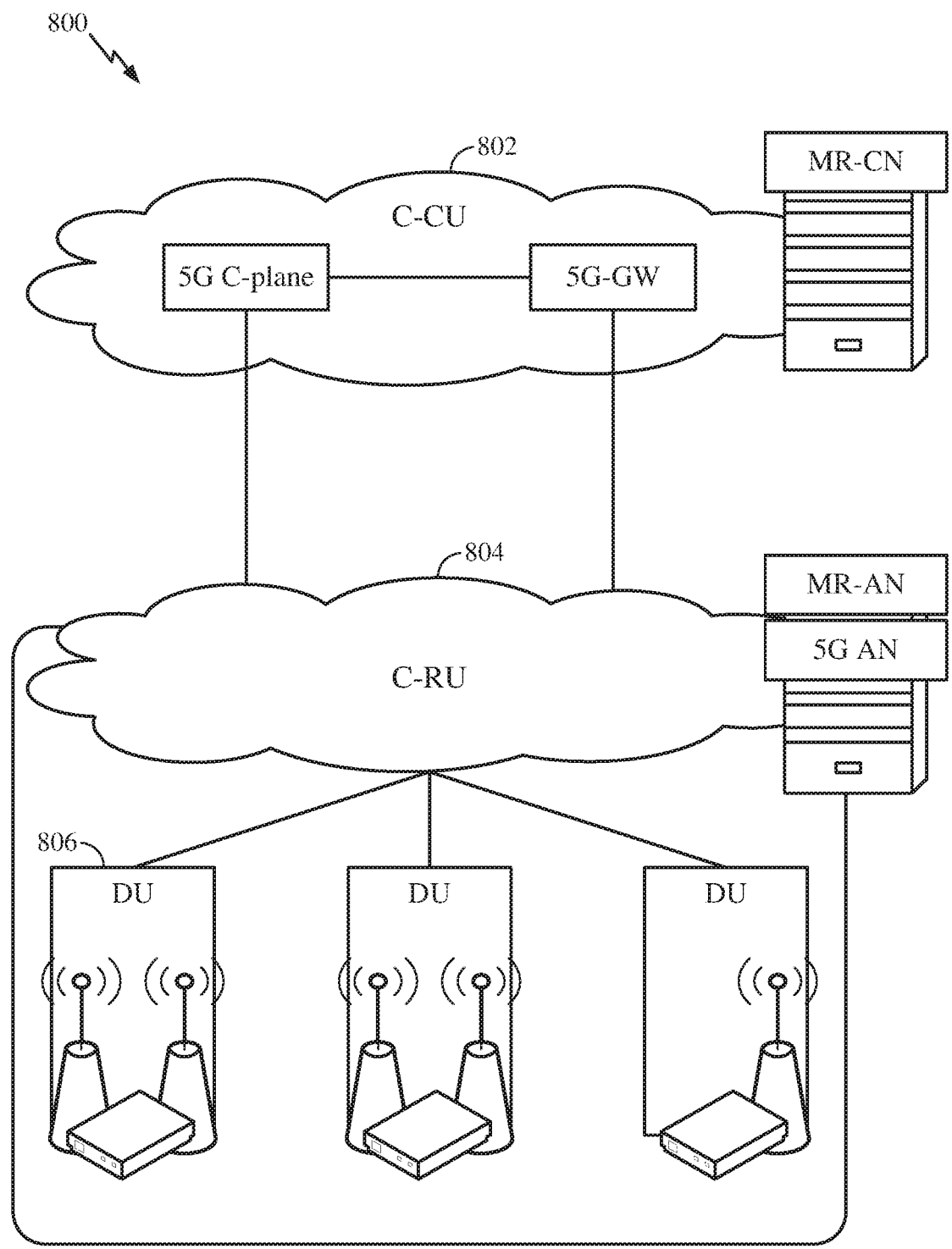
FIG. 8 illustrates an example physical architecture of a distributed RAN, in accordance with certain aspects of the present disclosure.

FIG. 8 illustrates an example physical architecture of a distributed RAN 800, according to aspects of the present disclosure. A centralized core network unit (C-CU) 802 may host core network functions. The C-CU may be centrally deployed. C-CU functionality may be offloaded (e.g., to advanced wireless services (AWS)), in an effort to handle peak capacity. A centralized RAN unit (C-RU) 804 may host one or more ANC functions. Optionally, the C-RU may host core network functions locally. The C-RU may have distributed deployment. The C-RU may be closer to the network edge. A distributed unit (DU) 706 may host one or more TRPs. The DU may be located at edges of the network with radio frequency (RF) functionality.

Figure 9:
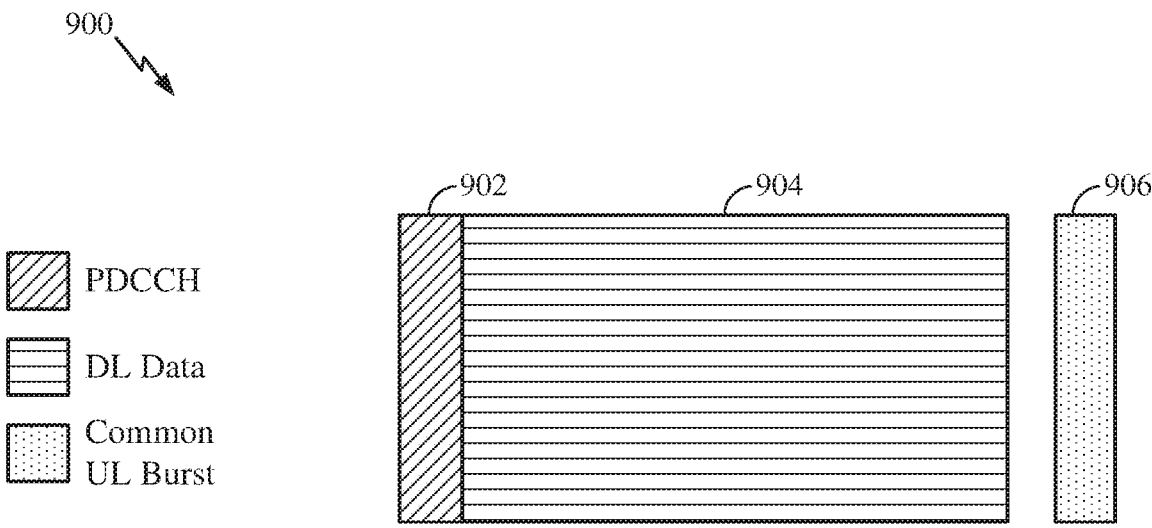
FIG. 9 is a diagram illustrating an example of a downlink (DL)-centric subframe, in accordance with certain aspects of the present disclosure.

FIG. 9 is a diagram 900 showing an example of a DL-centric subframe. The DL-centric subframe may include a control portion 902. The control portion 902 may exist in the initial or beginning portion of the DL-centric subframe. The control portion 902 may include various scheduling information and/or control information corresponding to various portions of the DL-centric subframe. In some configurations, the control portion 902 may be a physical DL control channel (PDCCH), as indicated in FIG. 9. The DL-centric subframe may also include a DL data portion 904. The DL data portion 904 may sometimes be referred to as the payload of the DL-centric subframe. The DL data portion 904 may include the communication resources utilized to communicate DL data from the scheduling entity (e.g., UE or BS) to the subordinate entity (e.g., UE). In some configurations, the DL data portion 904 may be a physical DL shared channel (PDSCH).

The DL-centric subframe may also include a common UL portion 906. The common UL portion 906 may sometimes be referred to as an UL burst, a common UL burst, and/or various other suitable terms. The common UL portion 906 may include feedback information corresponding to various other portions of the DL-centric subframe. For example, the common UL portion 906 may include feedback information corresponding to the control portion 902. Non-limiting examples of feedback information may include an ACK signal, a NACK signal, a HARQ indicator, and/or various other suitable types of information. The common UL portion 906 may include additional or alternative information, such as information pertaining to random access channel (RACH) procedures, scheduling requests (SRs), and various other suitable types of information. As illustrated in FIG. 9, the end of the DL data portion 904 may be separated in time from the beginning of the common UL portion 906. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 10:
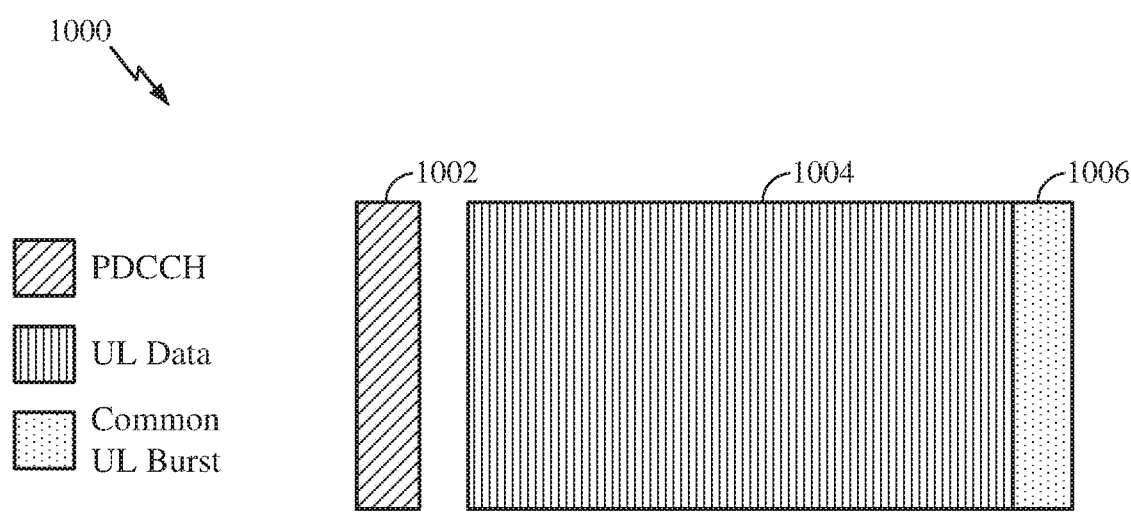
FIG. 10 is a diagram illustrating an example of an uplink (UL)-centric subframe, in accordance with certain aspects of the present disclosure.

FIG. 10 is a diagram 1000 showing an example of an UL-centric subframe. The UL-centric subframe may include a control portion 1002. The control portion 1002 may exist in the initial or beginning portion of the UL-centric subframe. The control portion 1002 in FIG. 10 may be similar to the control portion 1002 described above with reference to FIG. 9. The UL-centric subframe may also include an UL data portion 1004. The UL data portion 1004 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 1002 may be a physical DL control channel (PDCCH).

As illustrated in FIG. 10, the end of the control portion 1002 may be separated in time from the beginning of the UL data portion 1004. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 1006. The common UL portion 1006 in FIG. 10 may be similar to the common UL portion 1006 described above with reference to FIG. 10. The common UL portion 1006 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Example Uplink Multiple-Input Multiple-Output (MIMO) Scheduling Using Beamformed Reference Signals In closed loop uplink multiple-input-multiple-output (MIMO), a transmit receive point (TRP), such as an eNodeB or gNodeB, may estimate an uplink channel and an uplink interference covariance matrix to select beamforming parameters for wireless nodes (e.g., UEs) to use for subsequent uplink transmissions. The TRP can estimate the channel using an uplink reference signal, such as an uplink sounding reference signal (SRS) or an uplink channel state information reference signal (CSI-RS), and the TRP can estimate the interference covariance matrix based on past receptions. Using the estimates, the TRP can select wireless nodes and precoders for each wireless node. In some cases, a TRP can use multi-user MIMO with subband scheduling in the frequency domain, which may indicate, for example, the wireless nodes that can perform uplink transmissions to the TRP, the rank each wireless node can use for uplink transmissions, the subbands (in the frequency domain) each wireless node can use, and the precoder(s) each wireless node can use on each allocated subband.

Closed loop uplink MIMO generally allows a TRP to select wireless nodes and precoders by taking into account mutual interference between wireless nodes and other cell interference. In some cases, conveying a scheduling decision for each wireless node may consume a large amount of channel capacity on the downlink control channel. To reduce the amount of data transmitted on the downlink control channel, a TRP can use a codebook of precoders, and the TRP can convey the scheduling decision for each wireless node as an index in the codebook. In some cases, the TRP can use the same precoder for part or all of the allocated resources, which may reduce the signaling overhead for conveying the allocation to the wireless nodes. The use of the same precoder for the allocated resources may result in losses in link efficiency. In some cases, the interference estimates used for determining transmission parameters for the wireless nodes may differ from actual interference in a subsequent subframe, as the wireless nodes scheduled in different subframes may change.

In open loop uplink MIMO, a wireless node may select a precoder and transmit data using the selected precoder. Because the wireless node can select a precoder, an amount of data transmitted on the downlink control channel may be reduced. In some cases, a wireless node can select a precoder without using a codebook or being restricted to using the same precoder across several resources. In some cases, however, a wireless node may not have sufficient information to select an optimal precoder. For example, each wireless node may select precoders independently and may not be able to predict interference from other UEs or other cells at the TRP. The modulation and coding scheme (MCS) and MU-MIMO pairing may not be optimal, which may affect system efficiency.

Aspects of the present disclosure provide techniques to use a beamformed uplink reference signal to determine beamforming adjustments for subsequent uplink transmissions from a wireless node to a TRP. By receiving a beamformed reference signal from a wireless node, a TRP can use the beamformed reference signal and other information available at the TRP (e.g., mutual interference information) to identify transmission parameters for different wireless nodes to use in subsequent transmissions to the TRP. Advantageously, downselection of users and beams may reduce the amount of data to provide in a uplink grant by the TRP. In some cases, if the wireless node and the beams are selected without changes for data transmission, TRPs may obtain an accurate estimate of the interference covariance matrix, as the set of interferers may remain constant.

Figure 11:
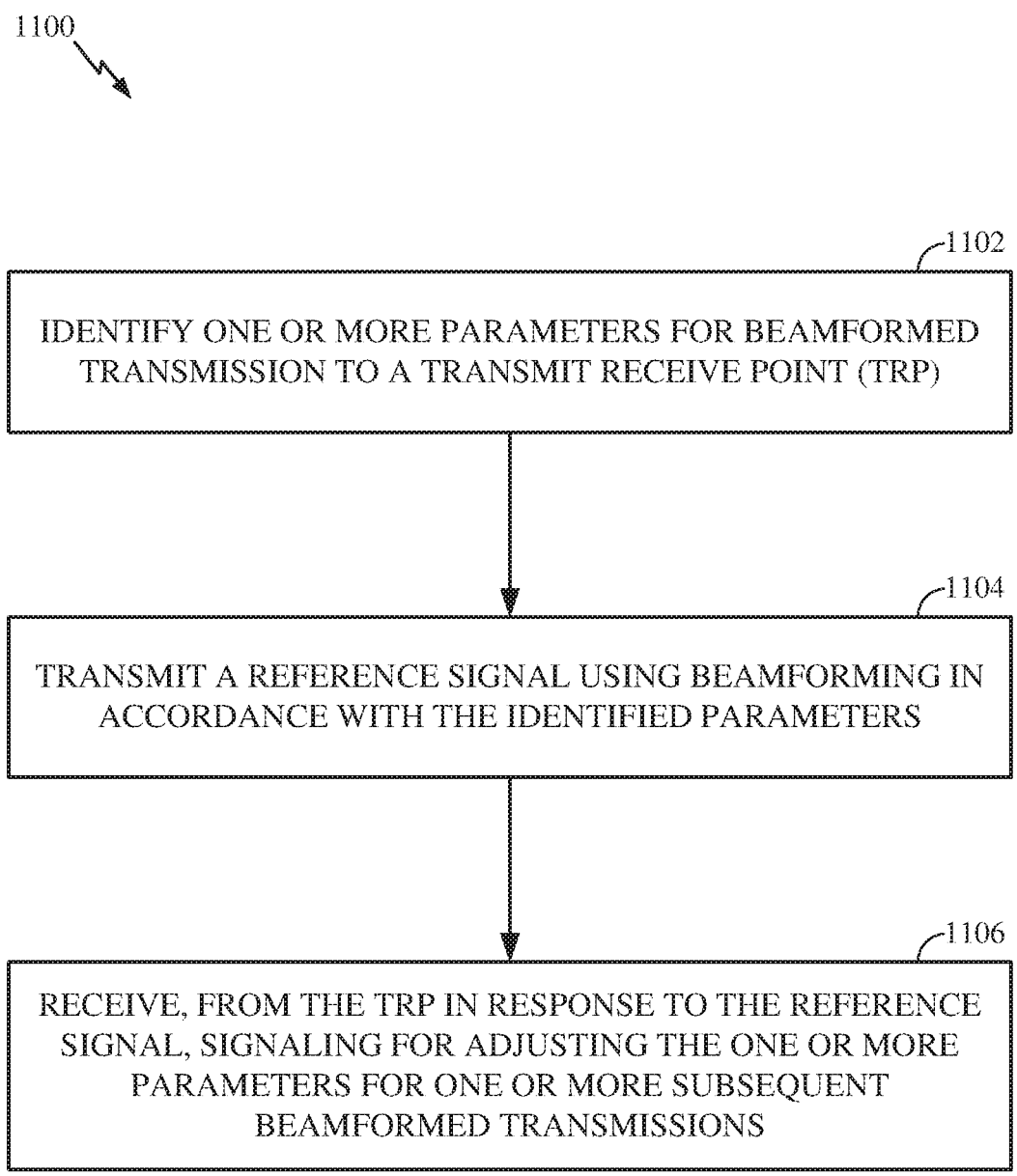
FIG. 11 illustrates example operations that may be performed by a wireless node to transmit a beamformed reference signal and perform subsequent transmissions to a transmit receive point (TRP) based on feedback related to the beamformed reference signal, in accordance with certain aspects of the present disclosure.

FIG. 11 illustrates example operations that may be performed by a wireless node (e.g., a UE) to beamform uplink transmissions to a transmit receive point (TRP), in accordance with certain aspects of the present disclosure. As illustrated, operations 1100 begin at 1102, where the wireless node identifies one or more parameters for beamformed transmission to a TRP. In some cases, the wireless node can identify the one or more parameters for beamformed transmission from an initial uplink grant from the TRP. The initial uplink grant may include, for example, a beam identification for a specific wireless node, an indication of a precoder matrix index, and so on. In some cases, the TRP may provide information to a wireless node for selection of a beam. The information may, for example, include an inter-cell interference covariance matrix estimated by the TRP based on past receptions. In some cases, the data may be received at the wireless node in a broadcast transmission from the TRP, which may reduce signaling overhead.

In some cases, the wireless node can identify the one or more parameters for beamformed transmission to the TRP independently of the TRP. The one or more parameters may be identified, for example, based on conditions at the wireless node, channel conditions, and/or knowledge of an interference profile for the TRP. In some cases, the wireless node can select a beam direction for transmitting the reference signal by cycling through a predefined codebook. In some cases, the beam direction may be selected using cyclic delay diversity. In some cases, the parameters may be identified from beamforming used for transmission of a downlink reference signal, which may implicitly indicate the beamforming used for a downlink reference signal. The beamformed downlink reference signal may be received by the wireless node via broadcast, groupcast, or unicast transmission. When the receiving station receives the downlink reference signal and performs channel estimation using the downlink reference signal, the receiving station can infer the channel condition and interference profile, which may be used for beam identification, as discussed herein.

At 1104, the wireless node transmits a reference signal using beamforming in accordance with the identified parameters. The reference signal may be, for example, a sounding reference signal (SRS) or a channel state information reference signal (CSI-RS).

Figure 12:
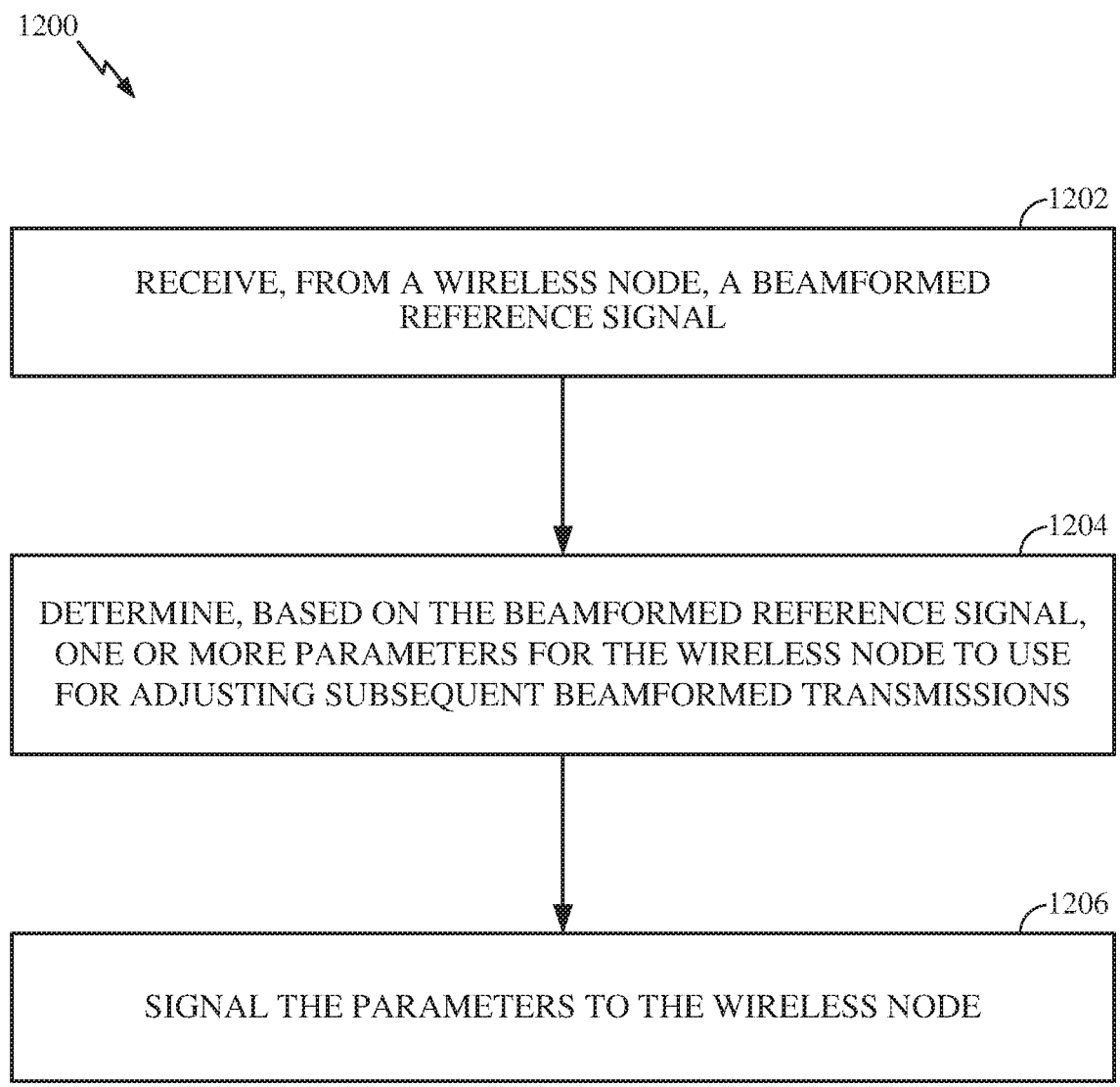
FIG. 12 illustrates example operations that may be performed by a transmit receive point (TRP) to determine beamforming parameters for transmissions from a wireless node based on reception of a beamformed reference signal from the wireless node, in accordance with certain aspects of the present disclosure.

At 1106, the wireless node receives, from the TRP and in response to the reference signal, signaling for adjusting the one or more parameters for one or more subsequent beamformed transmissions FIG. 12 illustrates example operations that may be performed by a transmit receive point (TRP) to select beamforming parameters for subsequent uplink transmissions by a wireless node based on a beamformed uplink reference signal, in accordance with certain aspects of the present disclosure. As illustrated, operations 1200 begin at 1202, where the TRP receives, from a wireless node, a beamformed reference signal. As discussed, the reference signal may be, for example, an SRS, a CSI-RS, and so on. The reference signal may be beamformed according to information provided to the wireless node by the TRP or based on a beamforming determination performed by the wireless node. The information may, in some cases, be provided to the wireless nodes via broadcast signaling.

At 1204, the TRP determines, based on the beamformed reference signal, one or more parameters for the wireless node to use for adjusting subsequent beamformed transmissions to the TRP. At 1206, the TRP signals the parameters to the wireless node. The TRP can signal the parameters to the wireless node, for example, in an uplink grant.

In some cases, the TRP can use the beamformed reference signal received from a wireless node to down-select nodes and beams to a set of nodes and beams that can be scheduled together. The set of nodes and beams may be selected, for example, based on mutual interference between the nodes and beams. The TRP may select a modulation and coding scheme (MCS) for each wireless node based on the downselected set of beams. In some cases, for a selected wireless node, the TRP may select its beam to be the same as the beam that the wireless node used for its beamformed reference signal. In some other cases, the TRP can modify and/or refine the beams selected for the wireless nodes to use for subsequent uplink transmissions based on interference between the selected beams of intra-cell wireless nodes.

In some cases, wireless nodes may be scheduled on the uplink such that uplink transmissions by a wireless node do not cause interference at a neighbor cell. With massive MIMO systems, TRPs and wireless nodes may have more antennas and use narrower beams, and the impact of a wireless node transmission on a neighbor TRP may be influenced on the proximity of the wireless node to the neighbor TRP, the transmit beam direction used by the wireless node, and the reception direction used by the neighbor TRP for receiver beamforming.

In some cases, the TRP can receive information from neighbor TRPs regarding interference caused by a wireless node. In some cases, the neighbor TRP can estimate interference from a wireless node based on the beamformed reference signal transmitted by the wireless node (e.g., by measuring interference on a reference signal resource). If the neighbor TRP determines that the wireless node is causing interference to the neighbor TRP, the neighbor TRP can indicate the interference to the serving TRP for the wireless node (e.g., via backhaul messaging). The indication of interference may, in some cases, include a request for the serving TRP to exclude the wireless node from beam and node downselection, which may mitigate interference. The serving TRP may subsequently exclude the wireless nodes from a group of downselected nodes and beams for subsequent uplink transmission to the serving TRP.

Figure 13:
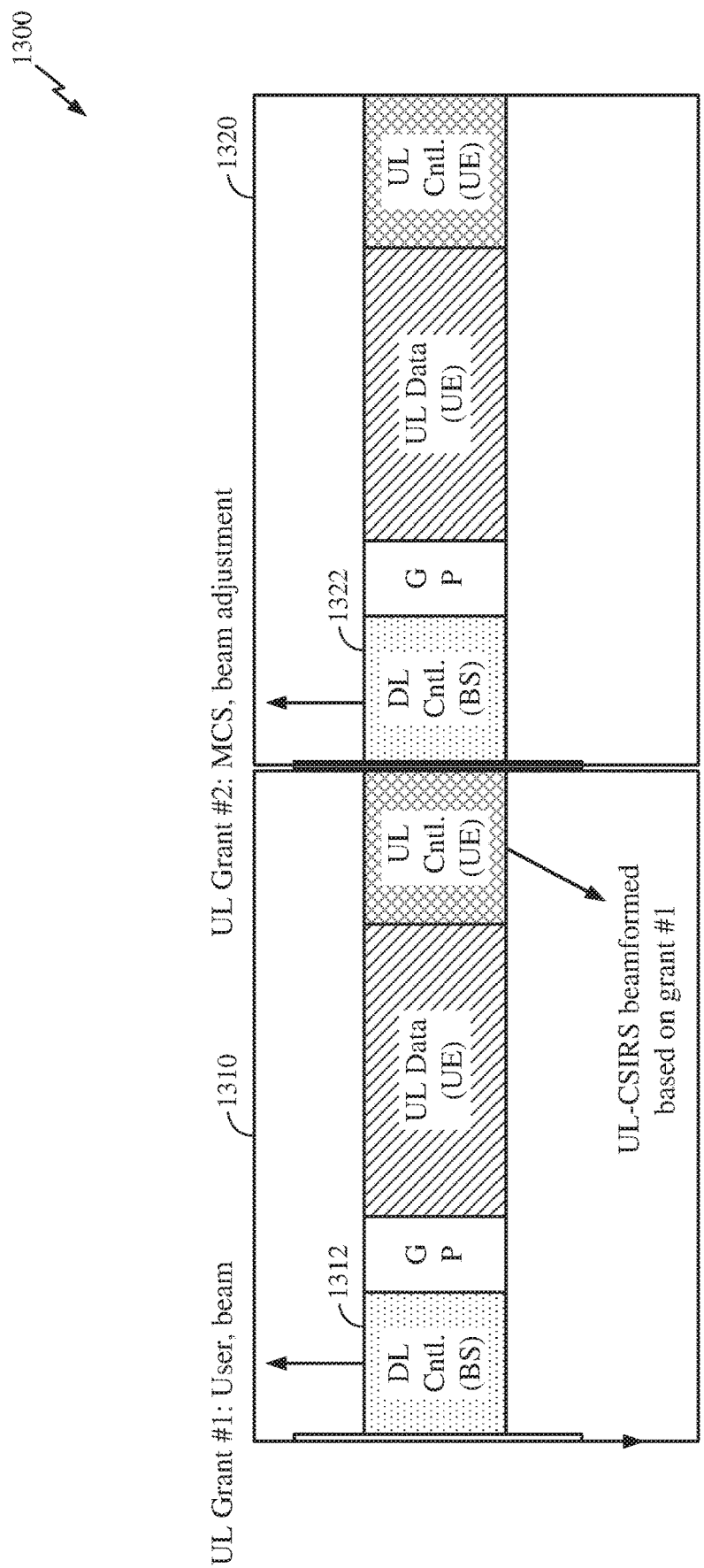
FIG. 13 illustrates an example frame exchange for scheduling uplink transmissions based on a beamformed reference signal, in accordance with certain aspects of the present disclosure.

FIG. 13 illustrates an example frame exchange 1300 between a wireless node and a TRP for transmitting a beamformed reference signal from the wireless node to the TRP and receiving, from the TRP, signaling for adjusting one or more parameters for subsequent beamformed transmissions, in accordance with an aspect of the present disclosure. As illustrated, in the first frame 1310, in an initial downlink portion (e.g., downlink control signaling) 1312, the TRP can provide an uplink grant to the wireless node identifying the wireless node and a beam for the wireless node to use for transmitting an uplink reference signal to the TRP. The wireless node can use the identified beam direction to transmit the uplink reference signal (e.g., an SRS or CSI-RS) in an uplink control portion of the frame. As discussed, based on the beamformed uplink reference signal, the TRP can perform user and/or beam downselection, MCS selection, and beam refinement.

In the downlink control portion 1322 of a subsequent frame 1320, the TRP can provide an uplink grant to the wireless node indicating beamforming parameters for the UE to use in subsequent uplink transmissions. The parameters may include, for example, an MCS and, optionally, beam adjustment information. The wireless node can beamform subsequent uplink transmissions (e.g., the uplink data and control portions of a frame) based on the received beamforming parameters.

Figure 14:
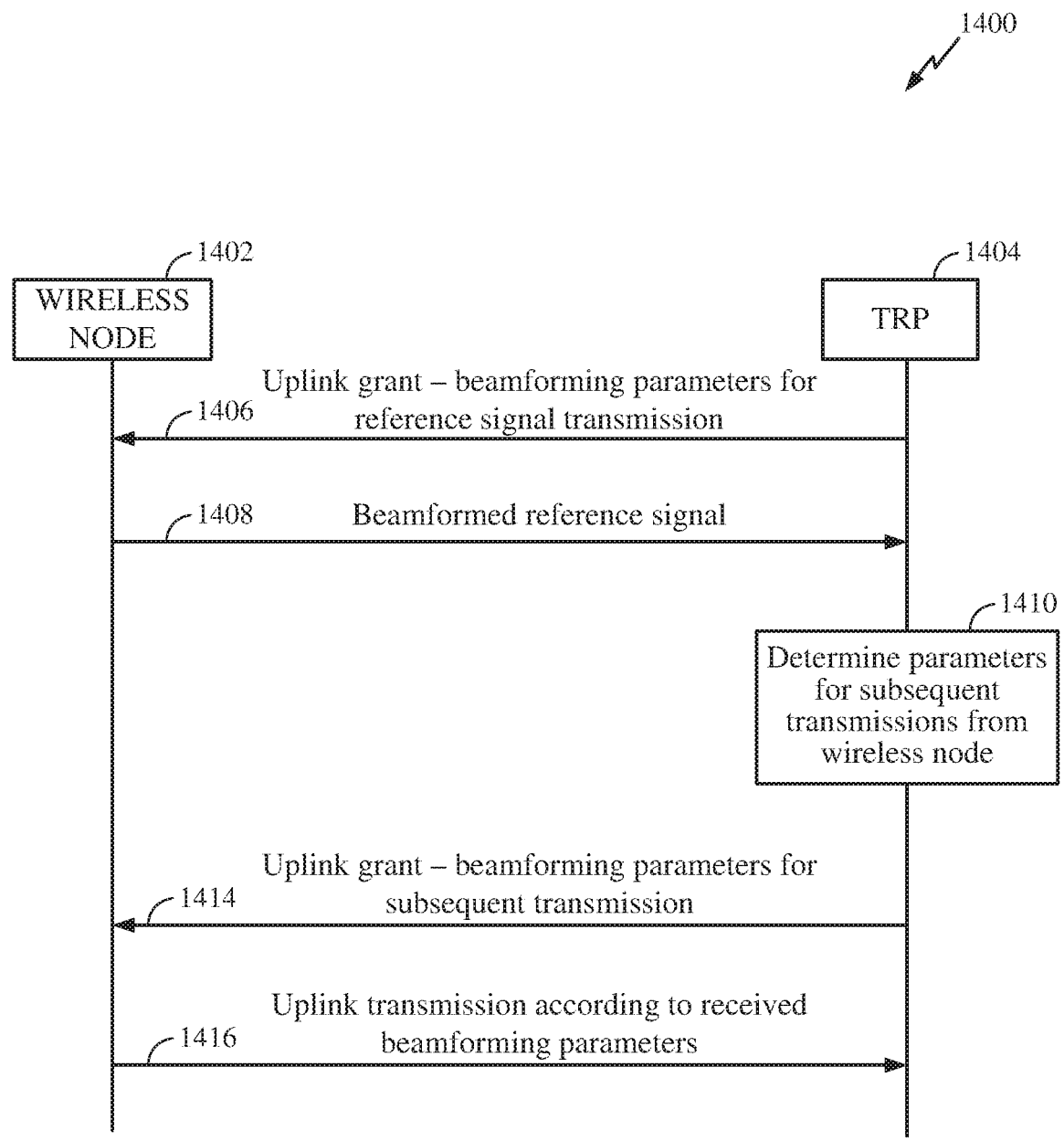
FIG. 14 is an example call flow diagram of messages that may be exchanged by a wireless node and a transmit receive point (TRP) to schedule uplink transmissions based on a beamformed reference signal, in accordance with certain aspects of the present disclosure.

FIG. 14 illustrates a call flow diagram of messages that may be exchanged between a wireless node 1402 and a TRP 1404, in accordance with certain aspects of the present disclosure. As illustrated, TRP 1404 may provide an uplink grant 1406 to the wireless node. Uplink grant 1406 may include beamforming parameters for the wireless node to use in transmitting an uplink reference signal. Based on the beamforming parameters received in uplink grant 1406, wireless node may transmit beamformed reference signal 1408 to TRP 1404.

At 1410, the TRP determines parameters for subsequent transmissions from the wireless node. As discussed, the TRP can determine the parameters for subsequent uplink transmissions from wireless node 1402 (e.g., beam selection, beam refinement, modulation and coding scheme, and so on) based, for example, on the beamformed reference signal, mutual interference information, and so on. TRP 1404 may subsequently transmit an uplink grant 1412 to wireless node 1402 with beamforming parameters for a subsequent uplink transmission. For a selected wireless node, if the TRP selects a precoding that is identical to the precoding used by the wireless node for its beamformed reference signal transmission, then the TRP may not indicate the precoding or any refinement in the uplink grant. Correspondingly, if the parameters in the grant do not indicate the precoding or any refinement to the precoding, the wireless node may apply the same precoding to its subsequent uplink transmission as the one that it applied to the beamformed reference signal. This option may help reduce the control signaling required to convey the grant. Wireless node 1402 can perform a subsequent uplink transmission 1414 according to the received beamforming parameters.

Figure 15:
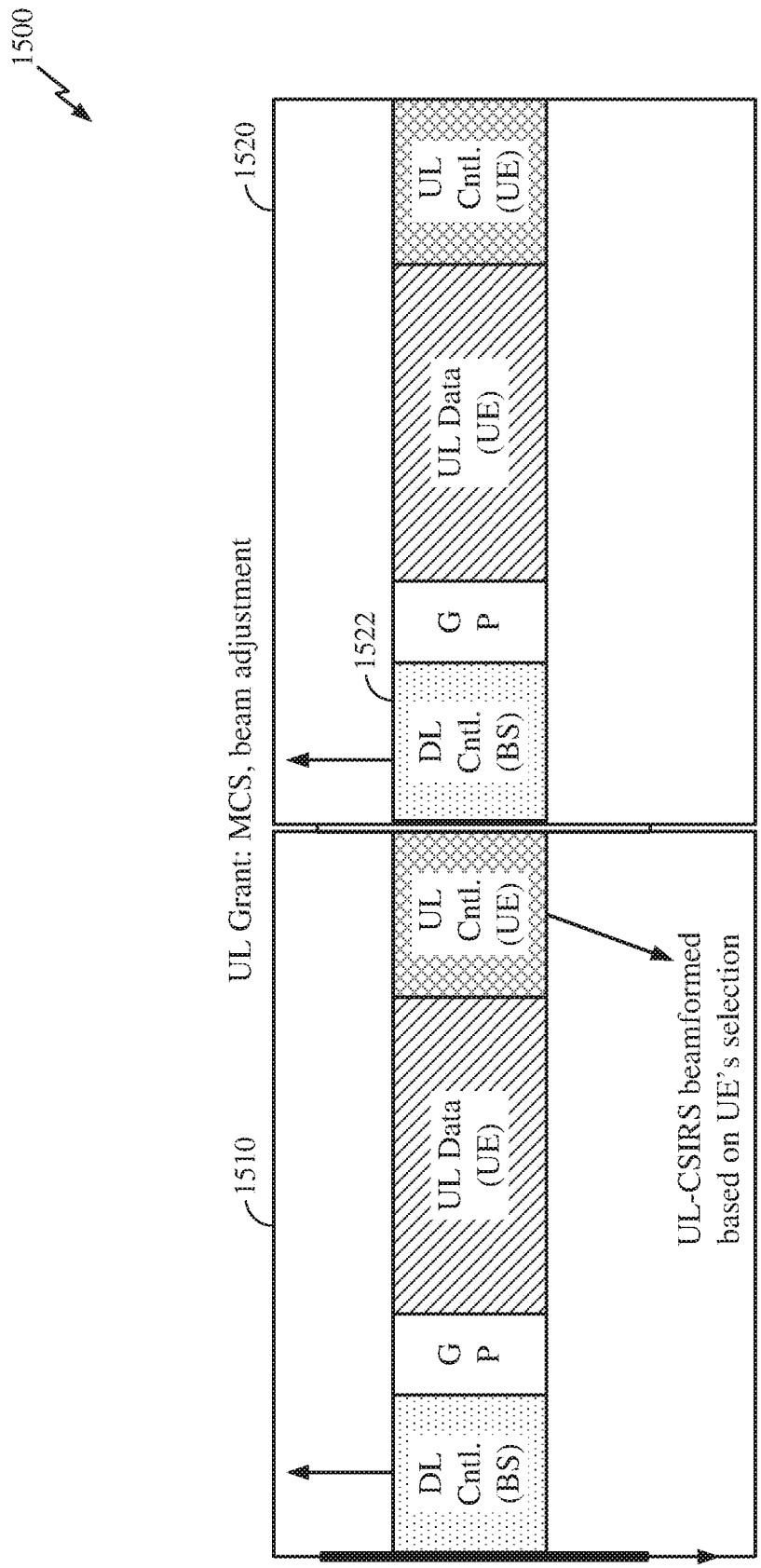
FIG. 15 illustrates an example frame exchange for scheduling uplink transmissions based on a beamformed reference signal, in accordance with certain aspects of the present disclosure.

FIG. 15 illustrates an example frame exchange 1500 between a wireless node and a TRP, in accordance with certain aspects of the present disclosure. As illustrated, in a first frame 1510, the wireless node may beamform an uplink reference signal (e.g., SRS or CSI-RS) based on a selection performed by the wireless node. The TRP receives the beamformed uplink reference signal and, as discussed, can perform user and/or beam downselection, MCS selection, and beam refinement based at least in part on the beamformed uplink reference signal.

As illustrated, the TRP may provide an uplink grant 1522 to the wireless node in a subsequent frame 1520. The uplink grant may indicate, for example, an MCS selection and, optionally, beam adjustment information for the wireless node to use in subsequent uplink transmissions. The wireless node can beamform subsequent uplink transmissions (e.g., the uplink data and control portions of a frame) based on the received beamforming parameters.

Figure 16:
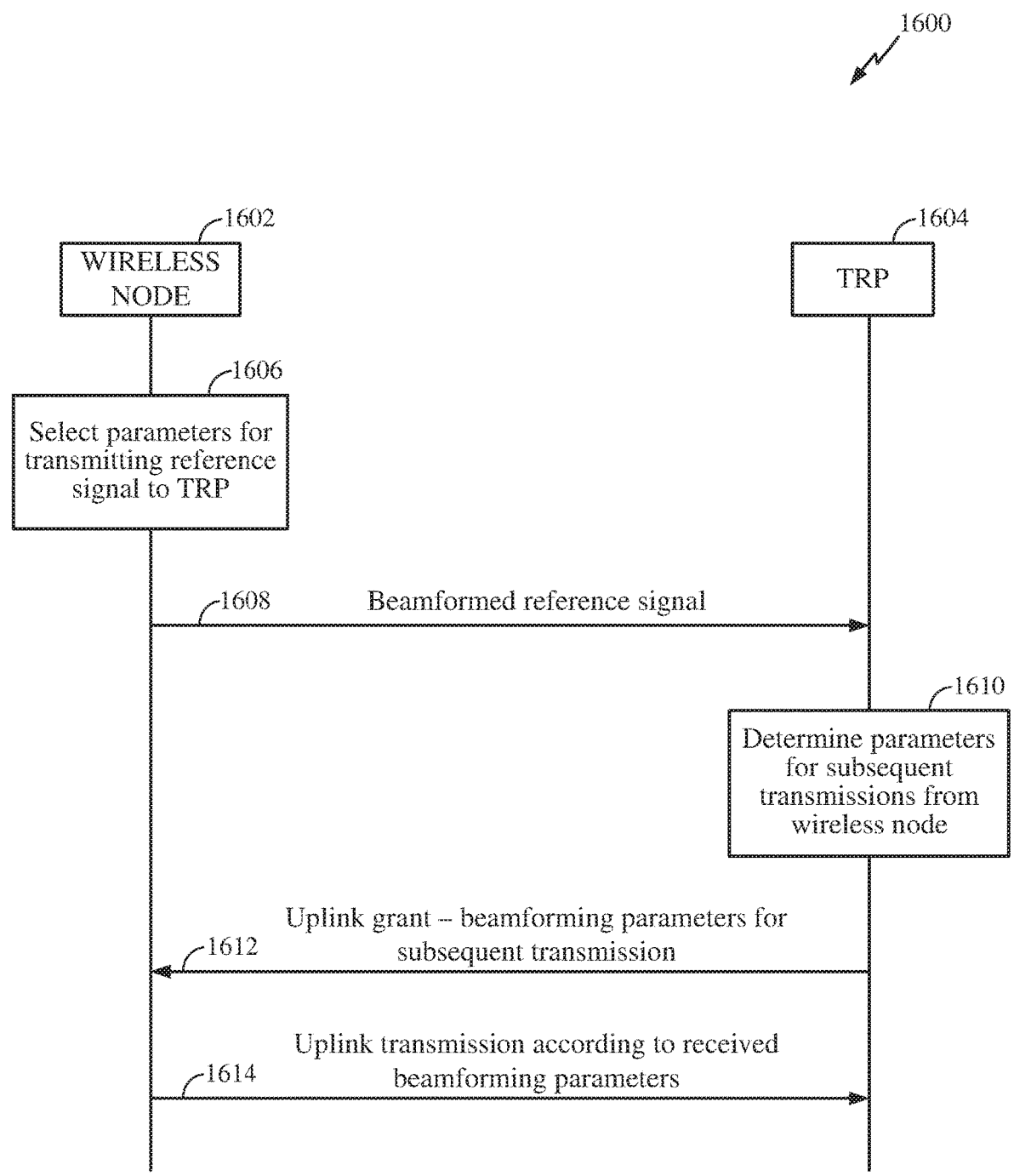
FIG. 16 is an example call flow diagram of messages that may be exchanged by a wireless node and a transmit receive point (TRP) to schedule uplink transmissions based on a beamformed reference signal, in accordance with certain aspects of the present disclosure.

FIG. 16 illustrates an example call flow 1600 of messages that may be transmitted between a wireless node 1602 and a TRP 1604 for selecting uplink beamforming parameters based on receiving, at the TRP, a beamformed reference signal, in accordance with certain aspects of the present disclosure.

As illustrated, at 1606, the wireless node selects parameters for transmitting the uplink reference signal to TRP 1604. As discussed, the wireless node can select a beam for transmitting the reference signal, for example, based on a channel condition, based on a TRP interference profile, by cycling through a predefined codebook, using cyclic delay diversity, based on the beamforming used by TRP 1604 for transmission of a downlink reference signal to the wireless node 1602, and so on. At 1608, based on the selected parameters, wireless node 1602 can transmit beamformed reference signal 1608 to TRP 1604.

At 1610, the TRP determines parameters for subsequent transmissions from the wireless node. As discussed, the TRP can determine the parameters for subsequent uplink transmissions from wireless node 1602 (e.g., beam selection, beam refinement, modulation and coding scheme, and so on) based, for example, on the beamformed reference signal, mutual interference information, and so on. TRP 1604 may subsequently transmit an uplink grant 1612 to wireless node 1602 with beamforming parameters for a subsequent uplink transmission. Wireless node 1602 can perform a subsequent uplink transmission 1614 according to the received beamforming parameters.

In some cases, a TRP can receive an SRS from a UE and interpret the precoding used by the UE for transmission of the SRS as a suggested precoding for subsequent uplink transmissions. The TRP may accept the suggested precoding as-is, and in response, the TRP can predict a signal-to-noise-plus-interference ratio (SINR), compute a modulation and coding scheme (MCS), and transmit, to the UE, an uplink grant with the computed MCS. The TRP need not transmit an indication of a precoder to the UE for uplink transmissions, which may reduce overhead used for control signaling. In some cases, the TRP may modify the suggested precoding. If the TRP modifies the suggested precoding, the TRP may transmit an uplink grant to the UE with precoding adjust information and the computed MCS. In still further cases, the TRP may reject the suggested precoding from the UE. To reject the suggested precoding, the TRP can decline to transmit an indication about an uplink grant to the UE.

In some cases, a TRP can indicate a set of sounding reference signal (SRS) precoding vectors to a UE. The UE may apply the indicated SRS precoding vectors to transmissions in the same or different time instances. For example, with four precoding vectors, a UE may transmit four SRSs with different precodings in the same symbol. In another example, the UE may transmit a two of four SRSs in a first symbol and transmit the other two of the four SRSs in a second symbol. Each of the four SRSs may be transmitted using different precodings. In some cases, the TRP can select one of the precoding vectors to be used for transmissions on PUSCH.

In some cases, beam refinement may be performed in a closed loop. A plurality of one-dimensional and/or two-dimensional precoding directions may be defined, and a UE may be initiated with an initial precoding matrix indicator (PMI). As the UE transmits reference signals to a TRP, the TRP can suggest updates to a precoding matrix used for communicating with the UE using a ΔPMI. The ΔPMI may be selected from a set of possible ΔPMI values. Updates may be signaled to a UE using unicast messaging or groupcast messaging (e.g., in a manner similar to transmission of uplink power control commands). The UE can refine the SRS based on the updated PMI and indicate a new precoding for the TRP to use for communicating with the UE (e.g., for performing data operations on the physical uplink shared channel). In some cases, PMI may be updated independently for different cells serving a UE.

In some cases, a UE may sweep a beam phase in both the horizontal and vertical directions. Sweeps may be performed in incremental steps, and for each step, the TRP may indicate to the UE information about the measured signal strength (e.g., whether the measured signal strength of an SRS transmitted from the UE to the TRP has increased or decreased relative to the measured signal strength for a previous SRS transmitted using a different beam direction). Based on the feedback received from the TRP, the UE can adapt a direction of beam phase adjustment (e.g., reversing a beam phase adjustment if signal strength decreases between transmission of successive SRSs).

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communications by a wireless node, comprising:
    identifying one or more parameters for beamformed uplink reference signal transmission to a transmit receive point (TRP);
    transmitting an uplink reference signal, wherein the uplink reference signal is beamformed in accordance with the one or more parameters; and
    receiving, from the TRP in response to the uplink reference signal, signaling comprising adjustments to the one or more parameters for use in one or more subsequent beamformed uplink transmissions, the adjustments to the one or more parameters identifying a change to be applied to a value of the one or more parameters used to beamform the uplink reference signal.

2. The method of claim 1, wherein the one or more parameters comprise at least one of a beam direction, a rank, or a modulation and coding scheme (MCS).

3. The method of claim 1, wherein the adjustments to the one or more parameters comprise an adjustment relative to a beam direction of the beamformed uplink reference signal.

4. The method of claim 1, wherein the identifying is based on information received from the TRP.

5. The method of claim 4, wherein the information comprises an indication of a precoder matrix index.

6. The method of claim 4, wherein the information comprises interference information estimated by the TRP.

7. The method of claim 4, wherein the information is received via one of broadcast or groupcast signaling.

8. The method of claim 1, wherein the identifying comprises selecting a beam for transmitting the uplink reference signal based on at least one of a channel condition or a TRP interference profile.

9. The method of claim 1, wherein the identifying comprises selecting a beam direction for transmitting the uplink reference signal by cycling through a predefined codebook.

10. The method of claim 1, wherein the identifying comprises selecting a beam direction for transmitting the uplink reference signal using cyclic delay diversity.

11. The method of claim 1, wherein the uplink reference signal comprises one of a channel state information reference signal (CSI-RS) or a sounding reference signal (SRS).

12. The method of claim 1, further comprising:
receiving, from the TRP, one of information about measured signal strength of the beamformed uplink reference signal or a change in measured signal strength of the beamformed uplink reference signal relative to a previously transmitted beamformed uplink reference signal; and
adjusting a direction of beam phase adjustment based, at least in part, on the information.

13. A method for wireless communications by a transmit receive point (TRP), comprising:
receiving, from a wireless node, a beamformed uplink reference signal;
determining, based on the beamformed uplink reference signal, adjustments to one or more parameters for the wireless node to use in one or more subsequent beamformed uplink transmissions, the adjustments to the one or more parameters identifying a change to be applied to a value of the one or more parameters used to beamform the uplink reference signal; and
signaling the adjustments to the one or more parameters to the wireless node.

14. The method of claim 13, wherein the one or more parameters comprise at least one of a beam direction, a rank, or a modulation and coding scheme (MCS).

15. The method of claim 13, wherein the adjustments comprise an indication of an adjustment, for subsequent uplink transmissions, relative to a beam direction the wireless node used for the beamformed uplink reference signal.

16. The method of claim 13, further comprising:
transmitting, to the wireless node, information identifying the one or more parameters for beamformed uplink transmission.

17. The method of claim 16, wherein the information comprises an indication of a precoder matrix index.

18. The method of claim 16, wherein the information comprises interference estimation information estimated by the TRP.

19. The method of claim 16, wherein the information is transmitted via one of broadcast or groupcast signaling.

20. The method of claim 13, wherein determining the adjustments to the one or more parameters comprises generating a down-selected set of beams for a group of wireless nodes based, at least in part, on mutual interference between wireless nodes in the group.

21. The method of claim 20, further comprising:
selecting a modulation and coding scheme for the wireless node and the one or more other wireless nodes based on the down-selected group of beams.

22. The method of claim 20, further comprising:
receiving, from a neighbor TRP, information indicating that the wireless node is causing interference to the neighbor TRP; and
excluding the wireless node from the group of wireless nodes.

23. The method of claim 22, wherein the information indicating that the wireless node is causing interference to the neighbor TRP is received via a backhaul link between the TRP and the neighbor TRP.

24. An apparatus for wireless communications, comprising:
a processor configured to:
identify one or more parameters for beamformed uplink transmission to a transmit receive point (TRP),
transmit an uplink reference signal, wherein the uplink reference signal is beamformed in accordance with the one or more parameters, and
receive, from the TRP in response to the uplink reference signal, signaling comprising adjustments to the one or more parameters for use in one or more subsequent beamformed uplink transmissions, the adjustments to the one or more parameters identifying a change to be applied to a value of the one or more parameters used to beamform the uplink reference signal; and
a memory coupled to the processor.

25. The apparatus of claim 24, wherein the identifying is based on information received from the TRP.

26. The apparatus of claim 24, wherein the identifying comprises selecting a beam for transmitting the uplink reference signal based on at least one of a channel condition or a TRP interference profile.

27. The apparatus of claim 24, wherein the identifying comprises selecting a beam direction for transmitting the uplink reference signal by cycling through a predefined codebook.

28. An apparatus for wireless communications, comprising:
a processor configured to:
receive, from a wireless node, a beamformed uplink reference signal,
determine, based on the beamformed uplink reference signal, adjustments to one or more parameters for the wireless node to use in one or more for adjusting subsequent beamformed uplink transmissions, the adjustments to the one or more parameters identifying a change to be applied to a value of the one or more parameters used to beamform the uplink reference signal, and
signal the adjustments to the one or more parameters to the wireless node; and
a memory coupled to the processor.

29. The apparatus of claim 28, wherein determining the adjustments to the one or more parameters comprises generating a down-selected set of beams for a group of wireless nodes based, at least in part, on mutual interference between wireless nodes in the group.

30. The apparatus of claim 28, wherein the processor is further configured to select a modulation and coding scheme for the wireless node and the one or more other wireless nodes based on the down-selected group of beams.

* * * * *